Patented Aug. 23, 1949

2,479,904

UNITED STATES PATENT OFFICE 2,479,904

INORGANIC BOND FOR CHLORINATION CHARGE

Sandford S. Cole, Metuchen, N. J., assignor to National Lead Company, New York, N. Y., a corporation of New Jersey No Drawing. Application June 12, 1945, Serial No. 599,129

7 Claims. (Cl. 23—87)

This invention relates to the production of volatilizable anhydrous metal chlorides, particularly titanium tetrachloride. It has special reference to the step involving the conditioning of the metalliferous material preparatory to the chlorinating or chloridizing reaction.

Dry reactions involving the formation of volatile anhydrous metal chlorides are invariably conducted at elevated temperatures under reducing conditions. A mixture of dry chlorine and a reducing gas, for example carbon monoxide, may be passed over or through the hot metalliferous material or the material may be intimately mixed with carbon or other carbonaceous materials and subsequently reacted with the dry chlorine gas at appropriate temperatures. As the reaction proceeds the metal constituents, the chlorides of which are volatile at the temperature of reaction, are removed with the exit gases and collected by condensation, while the unreacted portion or residue is mechanically removed.

Irrespective of the method used it will be appreciated that under large scale operations involving great masses of material it is imperative that the metalliferous reaction mass posesses porosity and at the same time sufficient mechanical strength so as to be able to support its own accumulative weight during the reaction. Porosity and structural strength of the reaction mass will permit the reaction gas or gases a rapid and complete penetration and access to all of the metalliferous material and exclude undue crumbling and avoid channeling. Thus, great efficiency in the use of the reaction gas is obtained and the amount of unreacted reactable material remaining in the residue is kept to a minimum.

The nature of the carbonizable substances required for the preparation of the reaction mixture will vary with the metalliferous material and the reaction temperature. In many cases, a combination of tar, pitch, asphalt, or like substance, with bituminous or other coal is mixed with the finely-divided metalliferous material and then briquetted. On subsequent heating in the absence of air, devolatilization takes place leaving the metalliferous material embedded in a coke-like residuum or structure possessing some degree of mechanical strength.

The chlorination mixture may also be prepared with previously coked carbonaceous materials, i. e. with materials in which the volatilizable portion has been completely or nearly completely removed. The mixture of metalliferous material and the coked carbonaceous substance is generally wet milled, then filtered and dried. Such procedure insures intimate contact between the metalliferous and carbonaceous materials. When using coked carbonaceous material in the preparation of the mixture the subsequent heating of the briquetted material in the absence of air may be characterized as a calcination operation rather than a carbonization step. When operating in this manner the mechanical bond obtained is somewhat better than that obtained when the devolatilization or carbonization is carried out in the presence of the metalliferous material.

The lack of a sufficiently strong bond in briquettes prepared by either method has been ascribed to the fact that the coking properties of bituminous coking coals, particularly when in finely divided conditions, are greatly impaired upon heating due to oxidation occurring as a result of the air which is absorbed in the coal structure. In order to increase the strength of the bond in the chlorination mass, it has been proposed to incorporate a binder, such as sodium silicate, into the reaction mixture.

Most metalliferous materials, particularly those containing titanium, e. g. rutile, ilmenite, titanium-containing residues of various origin, etc. themselves contain silicious materials. It will, therefore, be appreciated that the addition of silicate binder will introduce an additional quantity of silica with a corresponding attenuation of the valuable metal constituent. Furthermore, the titanium tetrachloride obtained in the ensuing chlorination will become unduly contaminated with silicon tetrachloride as a result of the introduction of additional silica with a consequent waste of valuable chlorine gas. It has now been discovered that a strong bond may be easily and economically attained by the addition to a metalliferous-carbonaceous chlorination mixture of a small amount of alkali metal hydroxide prior to heating. When operating with a previously coked carbonaceous material the heating may be conducted at relatively low temperatures. For example, a titaniferous material, such as residue from the hydrochloric acid leaching of ilmenite, might be mixed with a small amount of an alkaline metal hydroxide, preferably sodium hydroxide, and with carbonaceous material, and the whole heat treated at a relatively low temperature, say between 500°–600° C. to sinter the mass, and thus produce a reaction product of good porosity and excellent structural strength. On occasion it may be found desirable or necessary to conduct the heating within the broad range of temperatures from about 400° C. to about 1000° C.

The proportion of carbonaceous material to metalliferous may vary within the ratio of about 12-30 parts carbonaceous material to about 80 parts of metalliferous material, depending upon whether it is desired to form during subsequent chlorination carbon dioxide or carbon monoxide. The amount of alkali metal hydroxide which will be employed in the practice of the invention may vary between about 0.5 to about 7.0%, with a preferred range from 1.0 to about 4%.

When the metalliferous material is a titanium-containing material, the alkali metal hydroxide apparently reacts even at relatively low temperatures with oxidic compounds of titanium, as well as any siliceous substances present to form small amounts of alkali metal titanate and silicate both of which on heating promote a certain degree of sintering. By regulating the amount of alkali metal hydroxide, the temperature and duration of heating, it is possible to produce, particularly from briquette material, a product which possesses excellent mechanical and physical properties, i. e., porosity and strength which is superior to prior art products prepared with sodium silicate.

From the foregoing description of the present invention and the following illustrative examples, it will be appreciated that the objects of the present invention include a method for the preparation of chlorination reaction masses having good porosity and strength.

*Example I*

400 parts by weight of wet titanium concentrate (50% solids), analyzing on a dry basis:

| | Percent |
|---|---|
| $TiO_2$ | 85 |
| $Fe_2O_3$ | 2 |
| $SiO_2$ | 7 |
| $Al_2O_3$ approx | 1.5 |
| MgO approx | 4 | obtained from a hydrochloric acid leaching of ilmenite ore were mixed with 30 parts of pitch-coke dust, analyzing:

| | Percent |
|---|---|
| Fixed carbon | 98.5 |
| Volatile matter | 1.0 |
| Ash | 0.5 | to form a paste which was subsequently dried to 70-75% solids. To the partially dried paste 10 parts of NaOH in 30 parts of water was added and the whole thoroughly mixed. The moist cake was then further dried to 90-93% solids, crushed and screened then sent to a pellet machine. After heating under non-oxidizing conditions at about 900° C. for about two hours finely bonded pellets were obtained which during the ensuing chlorination reaction at about 500-600° C. did not crumble and were free from channeling effects.

For the purpose of comparison similar pellets were prepared, identical in every respect to the product of Example I, but without the sodium hydroxide. Such pellets were not finely bonded and when dropped on a stone table top from a height of only 6″ broke into fine powder, whereas the pellets made according to Example I, using sodium hydroxide, could be dropped from heights up to 10′ without breaking and when they did break after dropping from 10′ or higher, they broke into large pieces.

*Example II*

400 parts by weight of the same wet ore concentrate as used in Example I was mixed with 36 parts of oil-coke dust, analyzing:

| | Percent |
|---|---|
| Fixed carbon | 99.1 |
| Volatile matter | 0.8 |
| Ash | 0.1 | and dried to 90-95% solids followed by rewetting with 3 parts NaOH (1½%, calculated on the dry ore concentrate) in 30 parts of water. The moist mixture was then pressed into ⅝″ diameter pellets, which were heated at 400° C. 7½ hours under non-oxidizing conditions to effect cementation. A very hard pellet was obtained which in the ensuing chlorination operation at 500-600° C. did not crumble and avoided channeling effects.

Pellets similarly prepared but without sodium hydroxide crumbled to a powder when dropped on a stone table top from a height of only a few inches, whereas the pellets made according to the method of this example when dropped from a height of 8′ only chipped or fractured into large pieces.

Having now described and explained the working of my invention, what I claim is:

1. In a process for producing titanium chloride wherein titanium containing raw material is treated with a reducing agent and chlorine gas at elevated temperature, the steps of mixing together a carbonizable carbonaceous material, a titanium-containing material capable of yielding upon chlorination volatile titanium chlorides and a small amount of alkali metal hydroxide, pressing the mixture into a plurality of compact masses, heating said masses under non-oxidizing conditions until carbonization and cementation occurs and chlorinating the same.

2. In a process for producing titanium chloride wherein titanium containing raw material is treated with a reducing agent and chlorine gas at elevated temperature, the steps of mixing together a previously carbonized carbonaceous material, a titanium-containing material capable of yielding upon chlorination volatile titanium chlorides and a small amount of alkali metal hydroxide, pressing the mixture into a plurality of compact masses, heating said masses under non-oxidizing conditions until cementation occurs and chlorinating the same.

3. Method according to claim 1 wherein the alkali metal hydroxide is sodium hydroxide.

4. Method according to claim 2 wherein the alkali metal hydroxide is sodium hydroxide.

5. In a process for producing titanium chloride wherein titanium containing raw material is treated with a reducing agent and chlorine gas at elevated temperature, the steps of mixing together a carbonaceous material, a metalliferous titanium-containing material capable of yielding upon chlorination a volatile chloride and a small amount of alkali metal hydroxide, pressing the mixture into a plurality of compact masses, heating said masses under non-oxidizing conditions until carbonization and cementation occurs and chlorinating the same.

6. In a process for producing titanium chloride wherein titanium containing raw material is treated with a reducing agent and chlorine gas at elevated temperature, the steps of mixing together a carbonizable carbonaceous material, a titanium-containing material capable of yielding upon chlorination volatile titanium chlorides and from about 0.5% to about 7% by weight of alkali metal hydroxide, pressing the mixture into a plurality of compact masses, heating said masses under non-oxidizing conditions until cementation occurs and chlorinating the same.

7. In a process for producing titanium chloride wherein titanium containing raw material is treated with a reducing agent and chlorine gas at elevated temperature, the steps of mixing together a previously carbonized carbonaceous material, a titanium containing material capable of yielding upon chlorination volatile titanium chlorides and from about 0.5% to about 7% by weight of alkali metal hydroxide, pressing the mixture into a plurality of compact masses, heating said masses under non-oxidizing conditions until cementation occurs and chlorinating the same.

SANDFORD S. COLE.

REFERENCES CITED

The following references are of record in the file of this patent:

UNITED STATES PATENTS

| Number | Name | Date |
|---|---|---|
| 1,707,257 | De Rohden | Apr. 2, 1929 |

FOREIGN PATENTS

| Number | Country | Date |
|---|---|---|
| 442,853 | Great Britain | Nov. 16, 1934 |

OTHER REFERENCES

Searle, Refractory Materials: Their Manufacture and Uses, second edition, p. 421, pub. by Charles Griffen and Co., London, in 1924.